UNITED STATES PATENT OFFICE.

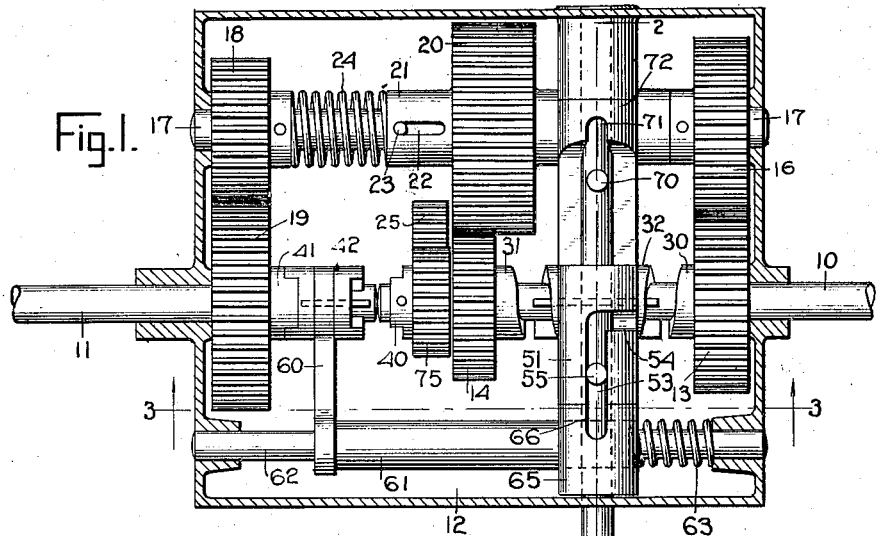

GEORGE Q. SEAMAN, OF NEW YORK, N. Y.

CHANGE-SPEED GEARING.

1,185,350. Specification of Letters Patent. Patented May 30, 1916.

Application filed December 23, 1915. Serial No. 68,351.

*To all whom it may concern:*

Be it known that I, GEORGE Q. SEAMAN, a citizen of the United States, and a resident of the city of New York, borough of Brooklyn, in the county of Kings and State of New York, have invented a new and Improved Change-Speed Gearing, of which the following is a full, clear, and exact description.
The invention relates to change speed gearing, such as shown and described in the Letters Patent of the United States, No. 1,052,977, granted to me on February 11, 1913.
The object of the invention is to provide a new and improved change speed gearing more especially designed for use on automobiles and other power-driven vehicles and devices, and arranged to permit the operator by manipulating a middle shifting device to readily change the speed from low to a medium or to a high speed, or to reverse without moving any of the power-driven transmitting gear wheels out of mesh.

In order to accomplish the desired result, use is made of clutches controlling different speeds, shifting forks engaging the said clutches, a shaft mounted to rock and to slide in the direction of its axis, the said shifting forks being mounted to swing loosely on the said shaft, actuating means controlled by the operator and connected with the said shaft for imparting a sliding or rocking movement to the shaft, and connecting means connecting the said shaft with any one of the said shifting forks independently of the others to operate the engaged shifting forks.

A practical embodiment of the invention is represented in the accompanying drawings forming a part of this specification, in which similar characters of reference indicate corresponding parts in all the views.

Figure 1 is a plan view of the speed gearing with the casing shown in section; Fig. 2 is a cross section of the same on the line 2—2 of Fig. 1; and Fig. 3 is a sectional side elevation of the same on the line 3—3 of Fig. 1.
The power or the engine shaft 10 is in axial alinement with the shaft 11 to be driven, and the said power shaft 10 and the driven shaft 11 extend into a gear casing 12 as plainly illustrated in the drawings. On the power shaft 10 within the gear casing 12 are mounted to rotate loosely gear wheels 13 and 14 of different diameters, and on the said power shaft 10 adjacent the smaller gear wheel 14 is secured a still smaller gear wheel 15. The gear wheel 13 is in mesh at all times with a gear wheel 16 secured on a countershaft 17 journaled on the casing 12 and arranged parallel to the shafts 10 and 11. On the shaft 17 is secured a gear wheel 18, less in diameter than the gear wheel 16 and in mesh with a larger gear wheel secured on the driven shaft 11. On the countershaft 17 is arranged a reversing gear wheel 20 rotating with the countershaft 17 and mounted to slide thereon in the direction of the axis of the countershaft 17. For this purpose the hub 21 of the reversing gear wheel 20 is provided with a slot 22 into which projects a pin 23 secured on the countershaft 17. A spring 24 is coiled on the countershaft 17 and abuts with one end on the gear wheel 18 and presses with its other end against the hub 21 to hold the reversing gear wheel 20 normally in a right-hand position, as shown in Figs. 1 and 3. The reversing gear wheel 20 is at all times in mesh with the gear wheel 14 on the power shaft 10, and the said reversing gear wheel 20 is also adapted to be moved into mesh with an intermediate gear wheel 25 journaled on a bracket 26 attached to the bottom of the gear casing 12. The intermediate gear wheel 25 is at all times in mesh with the gear wheel 15 secured on the power shaft 10. The width of the reversing gear wheel 20 is such that when it is moved from its normal position shown in Figs. 1 and 3 to the left then it remains in mesh with the gear wheel 14 and also moves in mesh with the intermediate gear wheel 25. When the reversing gear wheel 20 is in this position the rotary motion of the power shaft 10 is transmitted by way of the fixed gear wheel 15, the intermediate gear wheel 25 and the reversing gear wheel 20 to the shaft 17, and the rotary motion of the latter is transmitted by the gear wheels 18 and 19 to the driven shaft 11 to rotate the latter in an opposite direction to the rotary motion given to the power shaft 10.

On the inner face of the gear wheel 13 is secured or formed a clutch member 30 and a similar clutch member 31 is formed on the opposite face of the gear wheel 14. On the power shaft 10 intermediate the clutch members 30 and 31 is arranged a double clutch 32 mounted to rotate with the power shaft 10 and to slide thereon in the direction of the axis of the power shaft 10. Normally the clutch 32 is in inactive position, as shown in Figs. 1 and 3, but when the clutch 32 is moved to the right it engages the clutch member 30 and the rotary motion of the power shaft 10 is now transmitted by way of the clutch 32, the clutch 30, wheels 13 and 16 to the countershaft 17, and the rotary motion of the latter is now transmitted by the gear wheels 18 and 19 to the driven shaft 11 to rotate the latter in the same direction as the power shaft 10 and at second speed. When the clutch 32 is shifted to the left into engagement with the clutch member 31 then the rotary motion of the power shaft 10 is transmitted by the clutch 32, clutch member 31, gear wheels 14 and 20 to the countershaft 17 and the rotary motion of the latter is then transmitted by the gear wheels 18 and 19 to the driven shaft 11 to rotate the latter in the same direction as the power shaft 10 but at first speed according to the differences in the sizes of the gear wheels 13, 14 and 16, 20, respectively.

On the inner end of the power shaft 10 is secured a clutch member 40 and a clutch member 41 is secured on the opposite face of the gear wheel 19. A double clutch 42 is mounted on the driven shaft 11 to rotate therewith and to slide thereon in the direction of the axis of the driven shaft 11. The double clutch 40 is intermediate the clutch members 40 and 41 and is normally in engagement with the clutch member 41 so that the rotary motion of the gear wheel 19 is transmitted to the driven shaft 11 by way of its clutch member 41 and a double clutch 42. When the double clutch 42 is, however, shifted from its normal position shown in Figs. 1 and 3 to the right it disengages the clutch member 41 and engages the clutch member 40 so that the rotary motion of the power shaft 10 is now directly transmitted to the driven shaft 11 by way of the clutch member 40 and the double clutch 42.

In order to shift the double clutches 32 and 42 in the manner described and also to shift the reversing gear wheel 20 to the left against the tension of its spring 24, the following arrangement is made: In the top of the gear casing 12 is journaled a transversely extending rock shaft 50 mounted to rock and to slide in the direction of its axis. On the rock shaft 50 is mounted to turn loosely the hub 51 of a shifting fork 52 engaging the double clutch 32, and the top of the hub 51 is provided with a transversely extending slot 53 terminating in a branch slot 54 extending to the right, and into the said slot 53 projects a pin 55 secured on the rock shaft 50. On one outer end of the rock shaft 50 is arranged a handle 56 under the control of the operator to permit the latter to shift the rock shaft 50 in a transverse direction and to rock the same. When the several parts are in the neutral position shown in the drawings and the operator swings the handle 56 to the right then the pin 55 turns the hub 51 and thus swings the shifting fork 52 to the left thereby moving the double clutch 32 into engagement with the clutch member 31 to transmit the rotary motion of the power shaft 10 to the driven shaft 11 at first speed, as previously explained. When the operator swings the handle 56 to the left then the double clutch 32 is moved out of engagement with the clutch member 31 and returned to normal position. On a further swinging movement given to the handle 56 to the left the shifting fork 52 moves the double clutch 32 into engagement with the clutch member 30 to connect the power shaft 10 by way of the double clutch 32 and clutch member 30 with the gear wheel 13 to drive the driven shaft 11 from the power shaft 10 at second speed.

The double clutch 42 is engaged by a shifting fork 60 attached to a sleeve 61 mounted to slide on a rod 62 extending within the casing 12 and attached thereto. A spring 63 presses the right-hand end of the sleeve 61 to normally hold the double clutch 42 in engagement with the clutch member 41. The sleeve 61 is engaged by a shifting fork 64 (see Fig. 2) having its hub 65 mounted loosely on the rock shaft 50. The top of the hub 65 of the shifting fork 64 is provided at its inner end with a slot 66 normally in register with the slot 53 of the hub 51 of the shifting fork 52. When the operator slides the rock shaft 50 from the normal position shown in the drawings in the direction of the arrow $a'$ then the pin 55 moves out of the slot 53 and into the slot 66, and when the operator now imparts a swinging movement to the handle 56 to the left then the shifting fork 64 moves the sleeve 61 of the shifting fork 60 to the right whereby the double clutch 42 is moved out of engagement with the clutch member 41 and into engagement with the clutch member 40 to directly rotate the driven shaft 11 from the power shaft 10, as previously explained. When the handle 56 is returned to normal position then the spring 63 returns the shifting fork 60 and consequently the double clutch 42 to normal position, that is, moves it out of engagement with the clutch member 40 and into engagement with the clutch member 41.

On the rock shaft 50 is secured a second pin 70 adapted to be moved into engagement with a slot 71 formed in the hub 72 on a shifting fork 73, the said hub 72 being loosely mounted on the rock shaft 50. The shifting fork 73 engages the right-hand side of the hub 21 of the reversing gear wheel 20, as plainly indicated in Fig. 2.

When the several parts are in normal position, as shown in the drawings, and it is desired to reverse the driven shaft 11 then the operator pushes the handle 56 in the inverse direction of the arrow $a'$ until the pin 55 is opposite the branch slot 54 and the pin 70 is in engagement with the slot 71. The operator now swings the handle 56 to the right whereby the hub 72 is turned and the shifting fork 73 moves the gear wheel 20 to the left into engagement with the intermediate gear wheel 25. The rotary motion of the power shaft 10 is now transmitted by the fixed gear wheel 15, the intermediate gear wheel 25, the gear wheel 20, shaft 17 and gear wheels 18 and 19 to the shaft 11 but in a reverse direction to the power shaft 10. It is understood that when the handle 56 is swung to the right for reversing, as above described, the pin 55 moves into the branch slot 54 without affecting the position of the shifting fork 52 and the double clutch 32. After the reversing is completed the handle 56 is returned to vertical position and then moved in the direction of the arrow $a'$ to disengage the pin 70 from the slot 71 and to return the pin 55 to the slot 53 of the shifting fork 52.

In order to enable the operator to correctly move the handle 56 into any one of the positions described, use is made of a fixed segmental plate 80 provided on top with a transverse slot 81 through which extends the handle 56. From the slot 81, at or near the middle, lead branch slots 82 and 83 in opposite directions, from the forward end of the slot 81 leads a branch slot 84 to the left, and from the other end of the said slot 81 leads a branch slot 85 to the right. Normally the handle 56 extends through the slot 81 at the entrance ends of the slots 82 and 83 and when the handle 56 is moved to the right for first speed drive then it passes into the branch slot 82, and when the handle 56 is moved from normal position to the left it passes into the branch slot 83 for second speed drive. When the handle 56 is moved from normal position in the direction of the arrow $a'$ and then turned to the left, it passes into the slot 84 for directly driving the driven shaft 11 from the power shaft 10, and when the handle 56 is moved from its normal position in the inverse direction of the arrow $a'$ and then swung to the right it passes into the slot 85 for driving the shaft 11 from the power shaft 10 but in an opposite direction thereto.

The loose gear wheels 13, 14 and 19 are held against accidental shifting on their shafts 10 and 11 by lugs 90, 91 and 92 attached to or forming parts of the bottom of the casing 12, as plainly shown in Fig. 3.

The change speed gearing shown and described is very simple and compact and the operator is enabled to accurately shift the handle 56 into the desired position for driving the shaft 11 from the power shaft 10 either at a low speed, a medium speed or a high speed, or to reverse the motion of the said shaft 11, as above described.

Having thus described my invention, I claim as new and desire to secure by Letters Patent:

1. In a change speed gearing, the combination of clutches controlling different speeds, shifting forks engaging the said clutches, a shaft mounted to rock and to slide in the direction of its axis, the said shifting forks having hubs mounted to swing loosely on the said shaft, actuating means controlled by the operator and connected with the said shaft for imparting a sliding and rocking movement to the shaft, the said hubs of the shifting forks being provided with slots, and the said shaft having pins for engaging said slots for connecting the said shaft with any one of the said shifting forks independent of the others to operate the engaged shifting fork.

2. In a change speed gearing, the combination of clutches controlling different speeds, shifting forks engaging the said clutches, a shaft mounted to rock and to slide in the direction of its axis, the said shifting forks having hubs mounted to swing loosely on the said shaft, a handle on the said shaft and under the control of the operator, a guide for the said handle to guide the latter into a desired adjusted position, and interlocking means comprising pins on the said shaft and slots in the hubs of the said shifting forks to connect the shaft with any one of the said shifting forks to the exclusion of the others and according to the position of the said handle in the said guide.

3. In a change speed gearing, the combination of clutches controlling different speeds, shifting forks engaging the said clutches, a shaft mounted to rock and to slide in the direction of its axis, the said shifting forks being mounted to swing loosely on the said shaft, a handle on the said shaft and under the control of the operator, a segmental guide having a main guide slot, a branch guide slot leading from one side of the main slot for holding the handle in direct drive position, a slot extending from the said main slot in opposite directions for holding the said handle in either first or second speed positions, and a slot extending from the main slot to the side opposite the one having the said direct drive slot for holding the handle in reversing position, and interlocking pins and notches, of which the pins are on the said shaft and the notches are on the said shifting forks to connect the said shaft with any one of the said shifting forks according to the position of the said handle relative to the said branch slots.

4. A change speed gearing, comprising a power shaft, a shaft to be driven, a countershaft, two gear wheels of different diameters mounted to rotate loosely on the said power shaft, and provided at their opposite faces with clutch members, a gear wheel mounted to rotate loosely on the said driven shaft and provided with a clutch member, two gear wheels of different diameters fixed on the said countershaft, the larger one being in mesh with the larger of the said gear wheels on the lower shaft, and the smaller of the said fixed gear wheels on the countershaft being in mesh with the gear wheel on the said driven shaft, a clutch member fixed on the power shaft opposite the clutch member of the gear wheel on the driven shaft, a double clutch mounted to slide on the said power shaft and rotating with the same and adapted to be moved into engagement with either of the said clutch members of the loose gear wheels on the power shaft, a double clutch rotating with and slidable on the said driven shaft opposite the clutch members on the power shaft and that of the gear wheel on the driven shaft, shifting forks engaging the said double clutches, a transverse rock shaft mounted to rock and to slide in the direction of its length, the said shifting forks being loosely mounted on the said rock shaft, a spring pressing the said double clutch on the driven shaft to normally hold the said double clutch in engagement with the clutch member on the gear wheel loose on the driven shaft, means on the rock shaft and shifting forks to connect the rock shaft with one of the shifting forks at a time, and means controlled by an operator for imparting a sliding and rocking movement to the said rock shaft.

5. A change speed gearing, comprising a power shaft, a shaft to be driven, a countershaft, two gear wheels of different diameters mounted to rotate loosely on the said power shaft and provided at their opposite faces with clutch members, a gear wheel mounted to rotate loosely on the said driven shaft and provided with a clutch member, two gear wheels of different diameters fixed on the said counter shaft, the larger one being in mesh with the larger of the said gear wheels on the power shaft and the smaller of the said fixed gear wheels on the countershaft being in mesh with the gear wheel on the said driven shaft, a clutch member fixed on the power shaft opposite the clutch member of the gear wheel on the driven shaft, a double clutch mounted to slide on the said power shaft and rotating with the same and adapted to be moved into engagement with either of the said clutch members of the loose gear wheels on the power shaft, a double clutch rotating with and slidable on the said driven shaft opposite the clutch members on the power shaft and that of the gear wheel on the driven shaft, shifting forks engaging the said double clutches, a transverse rock shaft mounted to rock and to slide in the direction of its length, the said shifting forks being loosely mounted on the said rock shaft, a spring pressing the said double clutch on the driven shaft to normally hold the said double clutch in engagement with the clutch member on the gear wheel loose on the driven shaft, means on the rock shaft and shifting forks to connect the rock shaft with one of the shifting forks at a time, means controlled by an operator for imparting a sliding and rocking movement to the said rock shaft, and means for guiding the said rock shaft to any one of the desired positions and holding it therein.

6. A change speed gearing comprising a power shaft, a shaft to be driven, a countershaft, two gear wheels of different diameters mounted to rotate loosely on the said power shaft and provided at their opposite faces with clutch members, a gear wheel mounted to rotate loosely on the said driven shaft and provided with a clutch member, two gear wheels of different diameters fixed on the said countershaft, the larger one being in mesh with the larger of the said gear wheels on the power shaft and the smaller of the said fixed gear wheels on the countershaft being in mesh with the gear wheel on the said driven shaft, a slidable gear wheel mounted to slide on and to turn with the said countershaft and in mesh with the smaller of the gear wheels on the power shaft, a spring pressing the said slidable gear wheel, a gear wheel fixed on the said power shaft, an intermediate gear wheel in mesh with the said fixed gear wheel on the power shaft and adapted to be engaged by the said slidable gear wheel on the countershaft, a clutch member fixed on the power shaft opposite the clutch member of the gear wheel on the driven shaft, a double clutch mounted to slide on the said power shaft and rotating with the same and adapted to be moved into engagement with either of the said clutch members of the loose gear wheels on the power shaft, a double clutch rotating with and slidable on the said driven shaft opposite the clutch members on the power shaft and that of the gear wheel on the driven shaft, shifting forks engaging the said double clutches, a transverse rock shaft mounted to rock and to slide in the direction of its length, the said shifting forks being loosely mounted on the said rock shaft, a spring pressing the said double clutch on the driven shaft to normally hold the said double clutch in engagement with the clutch member on the gear wheel loose on the driven shaft, a shifting fork loose on the rock shaft and adapted to shift the said slidable gear wheel on the said countershaft, means on the rock shaft and shifting forks to connect the rock shaft with one of the shifting forks at a time, and means controlled by an operator for imparting a sliding and rocking movement to the said rock shaft.

7. In a change speed gearing, clutches controlling different speeds, shifting forks engaging said clutches, a shaft mounted to rock and to slide in the direction of its axis, the said shifting forks being mounted to swing loosely on the said shaft, a handle on the said shaft, a guide for said handle having a main guide slot, guide slots extending from the ends of the main slot in opposite directions, and intermediate slots extending in opposite directions from the main slot, and connecting means for connecting the shaft with any one of the shifting forks according to the position of the handle in the said slots.

8. In a change speed gearing, a power shaft, a driven shaft, in axial alinement with the power shaft, a countershaft, gears on the countershaft and on the power and driven shafts, whereby a plurality of forward speeds and a reverse speed are obtained, clutches controlling the different forward speeds, shifting forks engaging the said clutches, a shaft mounted to rock and to slide in the direction of its axis, the said shifting forks having hubs mounted to turn loosely on the said shaft, a shifting fork for controlling the reverse speed gear for reversing the movement of the driven shaft, the said shifting fork having a hub mounted loosely on the said shaft, means controlled by the operator and connected with said shaft for imparting a sliding and rocking movement to the shaft, and means for connecting the said shaft, with any one of the said shifting forks to operate the same.

In testimony whereof I have signed my name to this specification in the presence of two subscribing witnesses.

GEORGE Q. SEAMAN.

Witnesses:
EDWARD F. KEENAN,
JOSEPH L. TAYLOR.